United States Patent
Ko

(10) Patent No.: US 11,765,419 B2
(45) Date of Patent: *Sep. 19, 2023

(54) DISPLAY APPARATUS, IMAGE PROCESSING APPARATUS AND CONTROL METHOD FOR SELECTING AND DISPLAYING RELATED IMAGE CONTENT OF PRIMARY IMAGE CONTENT

(71) Applicant: SAMSUNG ELECTRONICS CO., LTD., Suwon-si (KR)

(72) Inventor: Seong-il Ko, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/526,147

(22) Filed: Nov. 15, 2021

(65) Prior Publication Data

US 2022/0078498 A1    Mar. 10, 2022

Related U.S. Application Data

(63) Continuation of application No. 16/562,509, filed on Sep. 6, 2019, now Pat. No. 11,202,115, which is a
(Continued)

(30) Foreign Application Priority Data

Jul. 11, 2007    (KR) .................. 10-2007-0069796

(51) Int. Cl.
*H04N 21/266*    (2011.01)
*H04N 21/235*    (2011.01)
(Continued)

(52) U.S. Cl.
CPC ............ *H04N 21/266* (2013.01); *H04N 5/76* (2013.01); *H04N 7/163* (2013.01);
(Continued)

(58) Field of Classification Search
None
See application file for complete search history.

(56) References Cited

U.S. PATENT DOCUMENTS

| | | |
|---|---|---|
| 5,539,479 A | 7/1996 | Bertram |
| 5,594,509 A | 1/1997 | Florin et al. |

(Continued)

FOREIGN PATENT DOCUMENTS

| | | |
|---|---|---|
| JP | 2001501068 A | 1/2001 |
| KR | 10-2003-0061156 A | 7/2003 |

(Continued)

OTHER PUBLICATIONS

Communication dated Jan. 29, 2019 issued by the European Patent Office in Counterpart European Application No. 17 169 970.5.
(Continued)

*Primary Examiner* — Junior O Mendoza
(74) *Attorney, Agent, or Firm* — Sughrue Mion, PLLC

(57) ABSTRACT

There is provided an image processing apparatus which comprises a receiver which receives primary image content; a communicator which communicates with at least one supply source which supplies related image content of the primary image content; a signal processor which processes and outputs the primary image content; and a controller which controls the communicator to request the supply source to supply the related image content, and controls the signal processor to process and play the related image content supplied from the supply source in response to the request if a user selects a key to play the related image content of the primary image content while the primary image content received by the receiver is processed by the signal processor.

22 Claims, 5 Drawing Sheets

Related U.S. Application Data continuation of application No. 15/648,066, filed on Jul. 12, 2017, now Pat. No. 10,440,415, which is a continuation of application No. 15/083,412, filed on Mar. 29, 2016, now Pat. No. 9,743,128, which is a continuation of application No. 13/709,820, filed on Dec. 10, 2012, now Pat. No. 9,319,728, which is a continuation of application No. 11/934,185, filed on Nov. 2, 2007, now Pat. No. 8,332,778.

(51) Int. Cl.

| | | |
|---|---|---|
| H04N 21/422 | (2011.01) | |
| H04N 21/431 | (2011.01) | |
| H04N 21/435 | (2011.01) | |
| H04N 21/47 | (2011.01) | |
| H04N 21/472 | (2011.01) | |
| H04N 21/4722 | (2011.01) | |
| H04N 21/84 | (2011.01) | |
| H04N 5/76 | (2006.01) | |
| H04N 7/16 | (2011.01) | |
| H04N 21/433 | (2011.01) | |
| H04N 5/765 | (2006.01) | |

(52) U.S. Cl.
CPC ..... *H04N 21/235* (2013.01); *H04N 21/42204* (2013.01); *H04N 21/435* (2013.01); *H04N 21/4312* (2013.01); *H04N 21/4314* (2013.01); *H04N 21/4316* (2013.01); *H04N 21/4331* (2013.01); *H04N 21/47* (2013.01); *H04N 21/4722* (2013.01); *H04N 21/47202* (2013.01); *H04N 21/84* (2013.01); *H04N 5/765* (2013.01)

(56) References Cited

U.S. PATENT DOCUMENTS

| | | | |
|---|---|---|---|
| 6,865,746 | B1 | 3/2005 | Herrington et al. |
| 7,581,238 | B1 | 8/2009 | Taylor et al. |
| 7,617,295 | B1 | 11/2009 | Farber et al. |
| 7,895,623 | B2 | 2/2011 | Cho |
| 7,903,953 | B2 | 3/2011 | Yoon et al. |
| 8,112,711 | B2 | 2/2012 | Ackley |
| 8,332,778 | B2 * | 12/2012 | Ko .............. H04N 21/266 725/86 |
| 8,434,118 | B2 | 4/2013 | Gonder et al. |
| 9,319,728 | B2 * | 4/2016 | Ko .............. H04N 5/76 |
| 9,565,387 | B2 | 2/2017 | Brodersen et al. |
| 9,743,128 | B2 * | 8/2017 | Ko .............. H04N 21/47202 |
| 10,440,415 | B2 * | 10/2019 | Ko .............. H04N 21/266 |
| 11,202,115 | B2 * | 12/2021 | Ko .............. H04N 21/235 |
| 2001/0042246 | A1 | 11/2001 | Yuen et al. |
| 2002/0143629 | A1 | 10/2002 | Mineyama |
| 2002/0174430 | A1 | 11/2002 | Ellis et al. |
| 2003/0208763 | A1 | 6/2003 | McElhatten et al. |
| 2003/0149982 | A1 | 8/2003 | Nakashima et al. |
| 2004/0154040 | A1 | 8/2004 | Ellis |
| 2004/0261127 | A1 | 12/2004 | Freeman |
| 2005/0166230 | A1 | 7/2005 | Gaydou et al. |
| 2005/0235316 | A1 | 10/2005 | Ahmad-Taylor |
| 2005/0246732 | A1 | 11/2005 | Dudkiewicz |
| 2006/0020966 | A1 | 1/2006 | Poslinski |
| 2006/0250650 | A1 * | 11/2006 | Narahara .......... H04N 21/25891 358/1.9 |
| 2006/0271980 | A1 | 11/2006 | Mankovitz |
| 2007/0154163 | A1 | 7/2007 | Cordray |
| 2008/0060008 | A1 * | 3/2008 | Wang .............. H04N 21/4828 725/39 |
| 2008/0062127 | A1 | 3/2008 | Brodersen |
| 2008/0066099 | A1 * | 3/2008 | Brodersen .............. G11B 27/34 348/E7.071 |
| 2008/0271078 | A1 * | 10/2008 | Gossweiler .......... H04N 21/47 725/40 |
| 2009/0077613 | A1 | 3/2009 | Edwards |
| 2010/0031162 | A1 | 2/2010 | Wiser et al. |
| 2012/0304228 | A1 | 11/2012 | Drazin et al. |

FOREIGN PATENT DOCUMENTS

| | | |
|---|---|---|
| KR | 1020040086916 A | 10/2004 |
| WO | 9848566 A2 | 10/1998 |
| WO | 02/49350 A1 | 6/2002 |
| WO | 03/032634 A2 | 4/2003 |
| WO | 2004/049692 A2 | 6/2004 |

OTHER PUBLICATIONS

Communication dated Jul. 13, 2018, issued by the European Patent Office in counterpart European Application No. 17169970.5.
Communication issued by the European Patent Office on Nov. 16, 2017 in counterpart European Patent Application No. 17169970.5.
Chinese Office Action, dated Sep. 7, 2011, issued in Application No. 200810090147.9.
Communication dated Feb. 24, 2017 issued by the European Patent Office in counterpart European Patent Application No. 08 103 144.5.
Communication dated Feb. 7, 2014 issued by the Korean Intellectual Property Office in counterpart Korean Patent Application No. 10-2007-0069796.
Communication dated Oct. 4, 2016 issued by the European Patent Office in counterpart European Patent Application No. 08103144.5.
Communication from the State Intellectual Property Office of P.R. China dated Mar. 31, 2011, in Application No. 200810090147.9.
Communication, dated Aug. 14, 2013, issued by the Korean Intellectual Property Office of the Republic of Korea, in counterpart Application No. 1020070069796.
European Search Report, dated Oct. 21, 2008, issued in Application No. 08103144.5.
Communication dated Jun. 21, 2016 from the United States Patent and Trademark Office in U.S. Appl. No. 15/083,412.
Communication dated Dec. 2, 2016 from the United States Patent and Trademark Office in U.S. Appl. No. 15/083,412.
Communication dated Dec. 12, 2019 from the United States Patent and Trademark Office in U.S. Appl. No. 16/562,509.
Communication dated May 13, 2020 from the United States Patent and Trademark Office in U.S. Appl. No. 16/562,509.
Communication dated Sep. 2, 2020 from the United States Patent and Trademark Office in U.S. Appl. No. 16/562,509.
Communication dated Jan. 4, 2021 from the United States Patent and Trademark Office in U.S. Appl. No. 16/562,509.
Communication dated Jan. 11, 2021 from the United States Patent and Trademark Office in U.S. Appl. No. 16/562,509.
Communication dated Apr. 9, 2021 from the United States Patent and Trademark Office in U.S. Appl. No. 16/562,509.

* cited by examiner

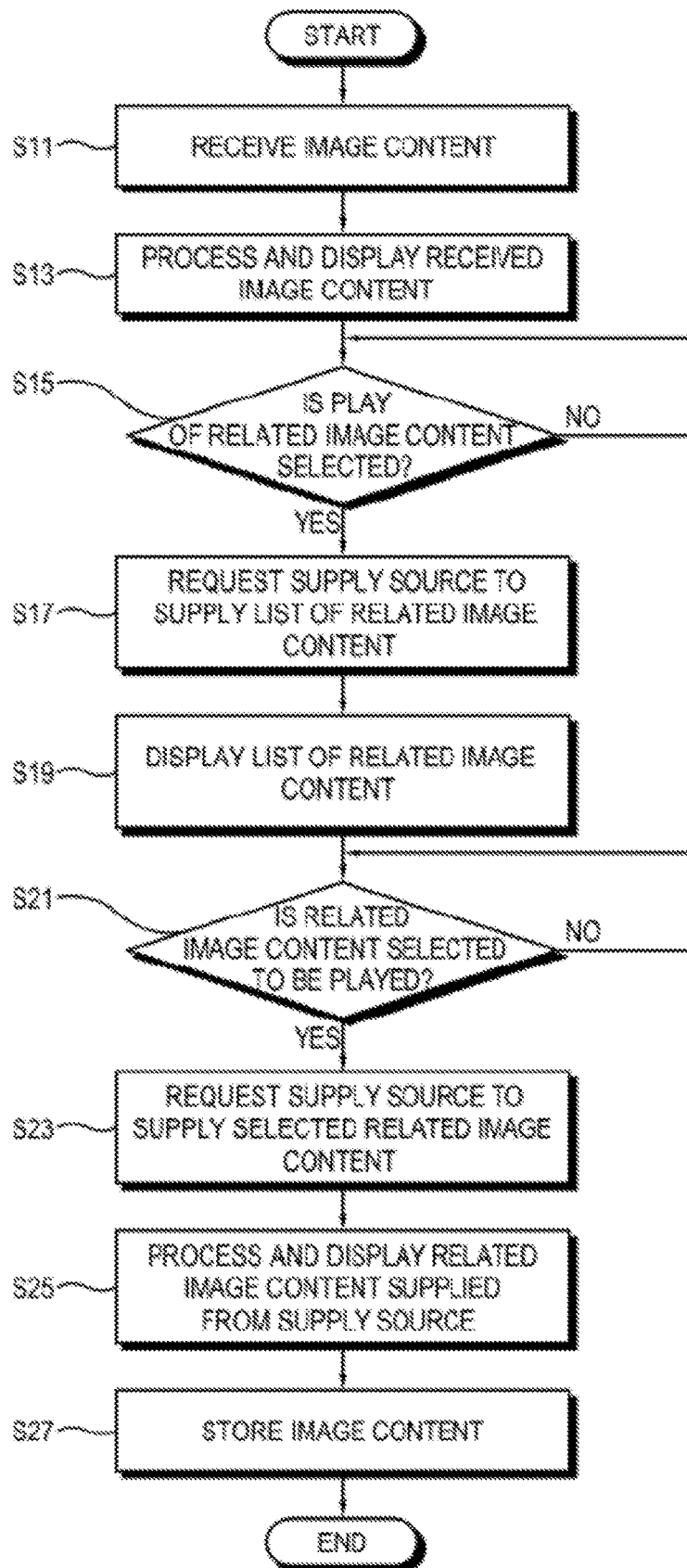

DISPLAY APPARATUS, IMAGE PROCESSING APPARATUS AND CONTROL METHOD FOR SELECTING AND DISPLAYING RELATED IMAGE CONTENT OF PRIMARY IMAGE CONTENT

CROSS-REFERENCE TO RELATED APPLICATIONS

This application is a Continuation of U.S. application Ser. No. 16/562,509, filed Sep. 6, 2019, which is a continuation of U.S. application Ser. No. 15/648,066, filed Jul. 12, 2017, issued as U.S. Pat. No. 10,440,415, which is a continuation of U.S. application Ser. No. 15/083,412, filed on Mar. 29, 2016, issued as U.S. Pat. No. 9,743,128, which is a continuation of U.S. application Ser. No. 13/709,820, filed on Dec. 10, 2012, issued as U.S. Pat. No. 9,319,728, which is a continuation of U.S. application Ser. No. 11/934,185, filed on Nov. 2, 2007, issued as U.S. Pat. No. 8,332,778, which claims priority from Korean Patent Application No. 10-2007-0069796, filed on Jul. 11, 2007 in the Korean Intellectual Property Office, the disclosures of which are incorporated herein by reference.

BACKGROUND

1. Field of Invention

Apparatuses and methods consistent with the present invention relate to an image processing apparatus and a control method thereof, and more particularly, to an image processing apparatus which processes and displays received image content, and a control method thereof.

2. Description of the Related Art

Generally, an image processing apparatus displays an image signal supplied from an external device such as a DVD, or processes and displays image content supplied from a broadcasting station. Particularly, terrestrial broadcasting stations, cable broadcasting stations and regional broadcasting stations provide image content in real-time according to broadcasting time schedules.

If a user selects a channel, the image processing apparatus tunes to a frequency band corresponding to the selected channel, and may receive image content from a broadcasting station.

If a user desires to view particular image content, he or she may check information on broadcasting time and channel of the image content and change to the corresponding channel to view the image content at the broadcasting time.

However, as the broadcasting station supplies the image content in real-time, the user would have to record the image content to view it after the broadcasting time of the image content elapses, which is inconvenient to the user.

Broadcasting stations now provide a video on demand (VOD) service which stores previously-broadcasted image content in a predetermined server and transmits requested image content among the stored image content if a user requests the image content.

However, the user would have to connect to the broadcasting station server to receive the image content through the VOD service, and search for the desired image content from the multiple stored image content. Several user manipulations are required to search for a requested image content, and accordingly, the time necessary to search for the image content is great.

SUMMARY

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an image processing apparatus which searches for and selects previously-broadcasted image content without difficulty, and a control method thereof.

According to another aspect of the present invention there is provided an image processing apparatus which is easily manipulated to select and view related image content of currently-viewed primary image content and improves user convenience, and a control method thereof.

According to another aspect of the present invention, there is provided an image processing apparatus which stores primary image content to be continuously viewed after related image content are viewed if the related image content of displayed primary image content are selected.

Additional aspects of the present invention will be set forth in part in the description which follows and, in part, will be obvious from the description, or may be learned by practice of the present invention.

The foregoing aspects of the present invention can be achieved by providing an image processing apparatus, which comprises: a receiver which receives primary image content; a communicator which communicates with at least one supply source which supplies related image content of the primary image content; a signal processor which processes and outputs the primary image content; and a controller which controls the communicator to request the supply source to supply the related image content, and controls the signal processor to process and play the related image content supplied from the supply source in response to the request if a user selects to play the related image content of the primary image content while the primary image content received by the receiver is processed by the signal processor.

The controller may request the supply source to transmit the related image content relating to at least one of a title, contents and a genre of the primary image content, based on additional information included in the primary image content.

The image processing apparatus may further include a user input unit which is provided to select a key to play the related image content, and the controller may request the supply source to transmit the related image content if the key to play the related image content is selected through the user input unit.

The image processing apparatus may further include a user interface (UI) generator, wherein the controller may request the supply source to transmit a list of the related image content, control the UI generator to generate a UI based on the list of the related image content supplied from the supply source, and request the supply source to transmit the related image content selected through the user input unit if the key to play the related image content is selected through the user input unit.

The image processing apparatus may further include a storage unit, wherein the controller may store the primary image content processed by the signal processor in the storage unit if the related image content is played.

The controller may control the signal processor to process the primary image content stored in the storage unit if the play of the related image content is finished.

The image processing apparatus may further include a storage unit, wherein the controller may store the primary image content processed by the signal processor in the storage unit if the related image content is played.

The controller may control the signal processor to process the primary image content stored in the storage unit if the play of the related image content is finished.

The image processing apparatus may further include a display unit.

The foregoing and/or other aspects of the present invention can be also achieved by providing an image processing apparatus, comprising: a communicator which receives primary image content from at least one supply source which supplies primary image content, and communicates with the supply source; a signal processor which processes and outputs the primary image content; and a controller which controls the communicator to request the supply source to supply related image content of the primary image content and controls the signal processor to process and play the related image content supplied from the supply source in response to the request if a user selects a key to play the related image content while the primary image content received through the receiver is processed by the signal processor.

The foregoing and/or other aspects of the present invention can also be achieved by providing a method of controlling an image processing apparatus, including: receiving primary image content from at least one supply source which supplies image content; processing the received primary image content; determining whether a user selects to play related image content of the primary image content while the received primary image content is processed; requesting the supply source to supply the related image content if the user selects a key to play the related image content; and processing and playing the related image content supplied from the supply source in response to the request.

The request to supply the related image content may include requesting the supply source to supply the related image content relating to at least one of a title, contents and a genre of the primary image content, based on additional information included in the primary image content.

The request to supply the related image content may comprise requesting at least one supply source of plural supply sources which supplies the primary image content, to supply the related image content.

The request to supply the related image content may comprise: requesting a list of the related image content to the supply source, generating a UI based on the list of the related image content supplied from the supply source, and requesting the related image content selected through the UI from the supply source.

The method may further include storing the processed primary image content if the related image content are played.

The method may further include processing and displaying the stored primary image content if the play of the related image content is finished.

BRIEF DESCRIPTION OF DRAWINGS

The above and/or other aspects of the present invention will become apparent and more readily appreciated from the following description of the exemplary embodiments, taken in conjunction with the accompanying drawings of which:

FIGS. 4 and 5 are flowcharts which illustrate a control method of the image processing apparatus according to the exemplary embodiment of the present invention.

DETAILED DESCRIPTION OF EXEMPLARY EMBODIMENTS

Hereinafter, exemplary embodiments of the present invention will be described with reference to accompanying drawings, wherein like numerals refer to like elements and repetitive descriptions will be avoided as necessary. The present invention, however, may be realized as various types, and is not limited to the exemplary embodiments.

Figure 1:
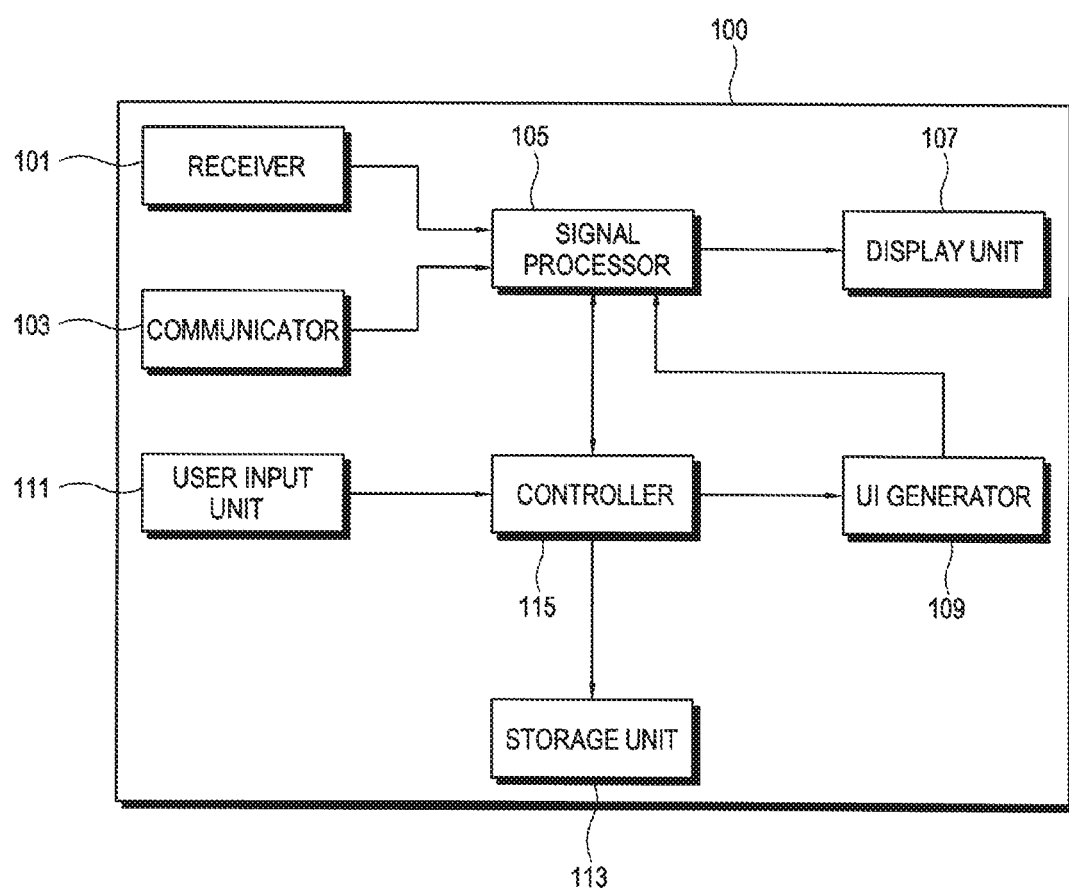
FIG. 1 is a control block diagram of an image processing apparatus according to an exemplary embodiment of the present invention.

FIG. 1 is a control block diagram of an image processing apparatus 100 according to an exemplary embodiment of the present invention. As shown therein, the image processing apparatus 100 includes a receiver 101, a communicator 103, a signal processor 105, a display unit 107, a user input unit 111, a UI generator 109, a storage unit 113 and a controller 115.

The receiver 101 receives primary image content, and may include a tuning unit (not shown) to receive the primary image content.

The tuning unit may include a single tuner or a plurality of tuners, a demodulator, a decoder, a multiplexer, etc. The tuner tunes a broadcasting signal having a frequency band corresponding to a tuning control signal of the controller 115 (to be described later). The broadcasting signal of the tuned channel is supplied as a transport stream which is packeted by time-division multiplexing a video signal, an audio signal and various data.

For example, if a digital broadcasting signal is received, the demodulator performs vestigial side band (VSB) demodulation and corrects errors with respect to the received broadcast signal, and outputs the transport stream. The tuner includes an analog tuner and a digital tuner to receive both an analog broadcasting signal and a digital broadcasting signal.

The communicator 103 communicates with at least one supply source to request related image content of the primary image content, and receives the related image content from the supply source according to control of the controller 115. The communicator 103 according to the present exemplary embodiment may communicate with the supply source connected through a wired/wireless LAN, modem, etc.

The supply source supplies the primary image content, and may include broadcasting stations (e.g. terrestrial broadcasting stations such as SBS, KBS and MBC, regional broadcasting stations and cable broadcasting stations), and a server storing the primary image content.

Figure 2:
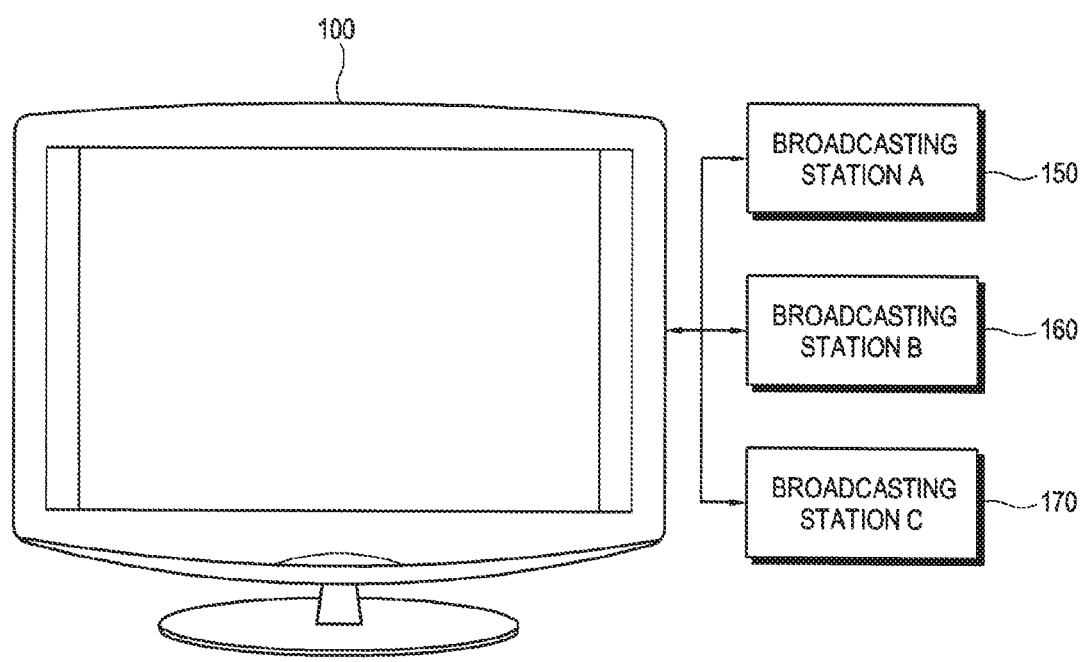
FIG. 2 illustrates communication between the image processing apparatus according to an exemplary embodiment of the present invention and a supply source supplying primary image content.

As shown in FIG. 2, the communicator 103 according to the present exemplary embodiment communicates with respective broadcasting stations 150, 160 and 170, each of which comprises a server which stores the primary image content therein, and receives the related image content stored in the server of the broadcasting stations 150, 160 and 170. The receiver 101 receives the primary image content supplied by the respective broadcasting stations 150, 160 and 170 in real-time through a radio frequency (RF) signal. The receiver 101 and the communicator 103 may be provided as an integrated chip (IC).

The signal processor 105 processes the primary image content supplied by the communicator 103, and converts the primary image content into a format displayable as an image on the display unit 107, e.g. into a digital RGB signal, and outputs the signal to the display unit 107 under the control of the controller 115.

The signal processor 105 may provide various functions corresponding to the format of the inputted image signal. For example, the signal processor 105 may provide functions such as an analog to digital (A/D) conversion function to convert various types of inputted analog image signals into digital signal in a particular format; a digital decoding function; a scaling function to scale a vertical frequency, resolution, or a picture ratio of an inputted digital image signal and/or analog image signal according to an output protocol of the display unit 107, and a predetermined formation conversion function.

The display unit 107 displays the primary image content processed by the signal processor 105. The display unit 107 may comprise digital light processing (DLP) technology, a liquid crystal display (LCD) and a plasma display panel (PDP). Alternatively, the display unit 107 may be provided as an external unit.

The UI generator 109 generates a user interface (UI) of a list illustrating at least one related image content supplied from the supply source under the control of the controller 115. The UI generator 109 may include an on screen display (OSD) generator or may be included in the signal processor 105 processing the primary image content. The generated UI is outputted and displayed on a part of the display unit 107.

The user input unit 111 includes a key to select a command to play the related image content of the primary image content currently displayed. The user input unit 111 may include a remote controller or a menu key provided on a casing, and a key signal generator to generate a key signal corresponding to key manipulation. The related image content may include titles, content, genres, etc. of the primary image content, which will be described in more detail later.

Particularly, the user input unit 111 according to the present exemplary embodiment may include a hot key to select a command to play the related image content while the received primary image content are displayed. The user input unit 111 may further include a number key and a direction key to select a channel, a function key to select a function provided in the image processing apparatus 100, etc.

The storage unit 113 stores the primary image content processed by the signal processor 105 if the key to play the related image content is selected through the user input unit 111 and the related image content supplied from the supply source are played. The storage unit 113 may comprise at least one of a hard disk, a random access memory (RAM), a flash memory, etc.

If the key used to input the command to play the related image content is selected through the user input unit 111 while the received primary image content is being processed, the controller 115 controls the signal processor 105 to process the related image content supplied from the supply source. The controller 115 may comprise a CPU, a microcomputer, etc.

More particularly, if the primary image content is received through the receiver 101, the controller 115 controls the signal processor 105 to process the received primary image content and display it on the display unit 107. If a channel is selected through the user input unit 111, the controller 115 tunes to the selected channel to receive the primary image content, and processes and displays the received image content.

The controller 115 determines whether the key to play the related image content is selected through the user input unit 111 while the primary image content is processed by the signal processor 105.

The related image content may include image content such as titles, contents, genres, etc. of the currently-processed image content. Preferably but not necessarily, the related image content may include image content broadcast before the currently-viewed image content. For example, if the currently-viewed drama is the fifth episode, the related image content may comprise the fourth, third, second and first episodes.

If the key to play the related image content is selected through the user input unit 111, the controller 115 checks additional information included in the primary image content. The additional information may include a broadcasting station transmitting the image content, the title, contents, playing time, file size of the image content, etc.

The controller 115 requests the broadcasting station transmitting the primary image content, i.e. the supply source through the communicator 103 to supply the related image content, based on the checked additional information. If the supply source transmits the related image content in response to the request, the controller 115 controls the signal processor 105 to process the transmitted related image content to be played.

The controller 115 generates a query to request the list of the related image content to the supply source transmitting the image content, by using the additional information. If the supply source transmits the list of the related image content in response to the query, the controller 115 controls the UI generator 109 to generate a UI of the list.

Figure 3:
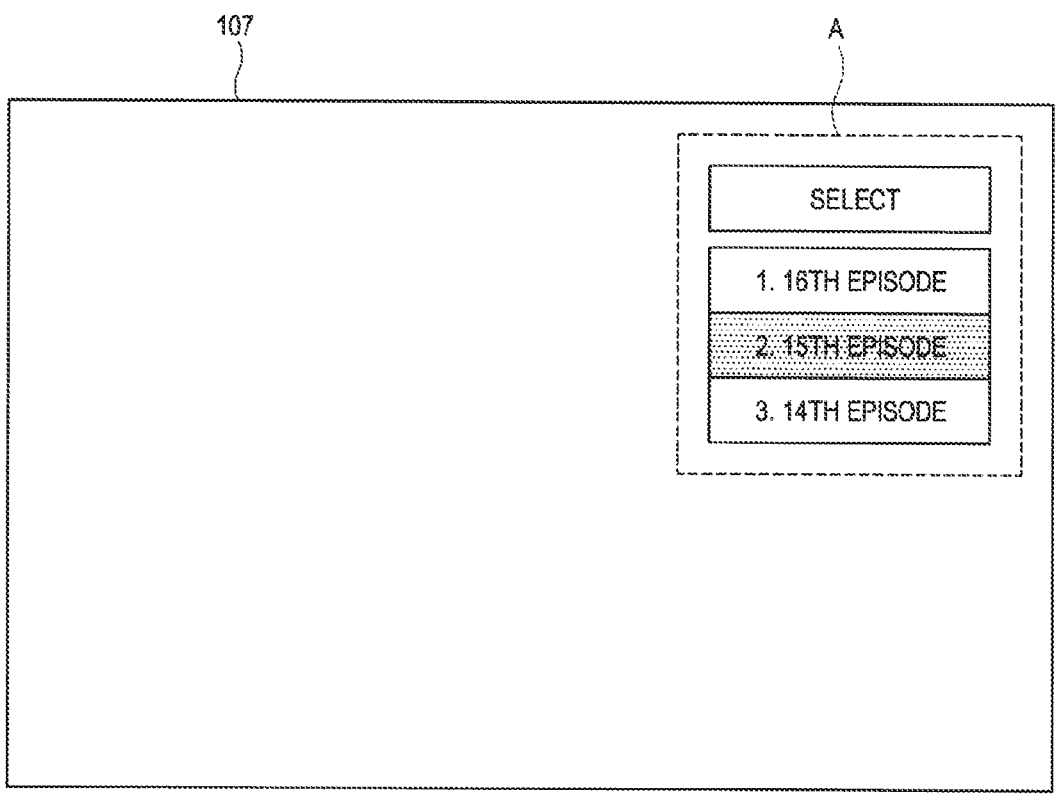
FIG. 3 illustrates a UI which shows a list of related image content according to the exemplary embodiment of the present invention.

For example, the related image content may include the previously broadcast image content. In this case, if a user is currently viewing the 17th episode of a drama, a UI A may be generated as shown in FIG. 3. The user may select one of the related image content on the list displayed in the UI A through the direction key provided in the user input unit 111.

If one of the related image content in the UI A is selected through the user input unit 111, the controller 115 controls the communicator 103 to request the supply source to transmit the selected related image content. If the supply source supplies the selected related image content, the controller 115 controls the signal processor 105 to play the supplied related image content.

If the signal processor 105 processes the related image content, the controller 115 controls the storage unit 113 to store the primary image content received by the receiver 101 and processed by the signal processor 105.

Moreover, the controller 115 controls the signal processor 105 to process and display the primary image content stored in the storage unit 113 or controls the UI generator 109 to generate a UI of a list illustrating the stored primary image content if the processing of the related image content is finished.

Thus, a user may select and view the related image content of the currently-viewed primary image content through simple key manipulation. If the related image content of the displayed primary image content is selected, the currently-viewed image content is additionally stored so that a user may view the stored primary image content after viewing the related image content.

Figure 4:
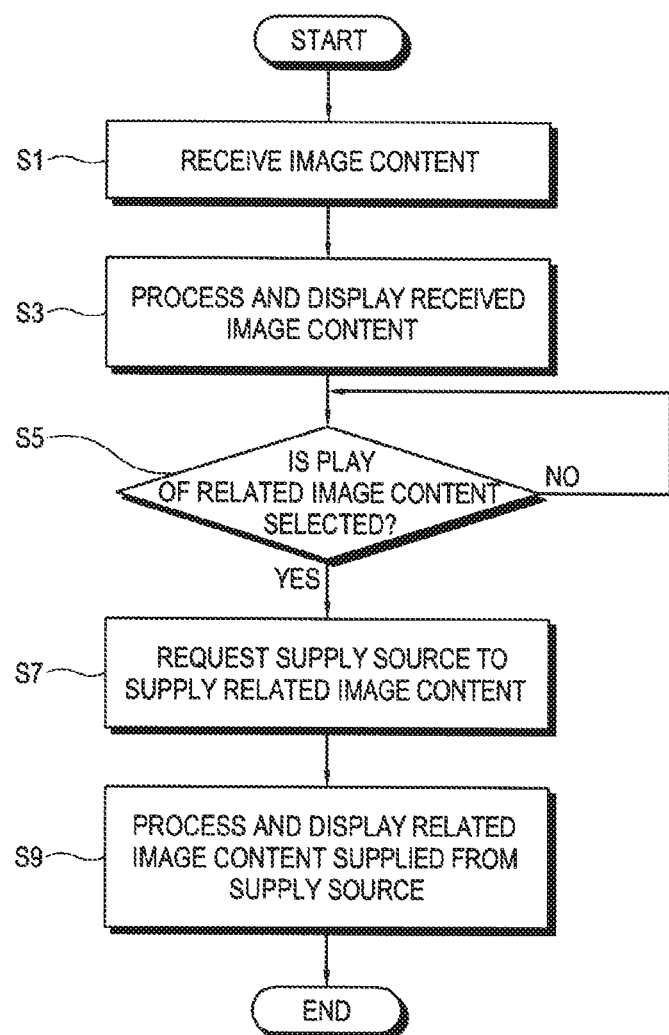

A control method of the image processing apparatus 100 according to the exemplary embodiment of the present invention is hereinafter described with reference to FIG. 4.

As shown therein, if the primary image content is received (operation S1), the controller 115 controls the signal processor 105 to process and display the received primary image content (operation S3).

The controller 115 determines whether a user selects the key to play the related image content of the displayed primary image content (operation S5).

If it is determined at operation S5 that the key to play the related image content is selected, the controller 115 requests the supply source supplying the primary image content to transmit the related image content (operation S7).

If the supply source supplies the related image content, the controller 115 controls the signal processor 105 to process and play the related image content (operation S9).

The control method of the image processing apparatus 100 according to the exemplary embodiment of the present invention will be described in more detail with reference to FIG. 5.

As shown in FIG. 5, if the primary image content are received (operation S11), the controller 115 controls the signal processor 105 to process and display the received primary image content (operation S13).

The controller 115 determines whether a user selects the key to play the related image content of the primary image content (operation S15). If the key to play the related image content is selected, the controller 115 requests the supply source to transmit a list of the related image content (operation S17).

The controller 115 checks the additional information included in the primary image content, generates and transmits a query requesting the list of the related image content to the supply source supplying the primary image content, by using the additional information of the image content.

The controller 115 controls the UI generator 109 to generate the UI of the list illustrating the related image content supplied from the supply source (operation S19).

If the related image content selected from the UI through the user input unit 111 is to be played (operation S21), the controller 115 requests the supply source to supply the selected related image content (operation S23).

If the supply source supplies the related image content, the controller 115 controls the signal processor 105 to process and play the supplied related image content (operation S25).

If the related image content is played, the controller 115 controls the storage unit 113 to store the primary image content received by the receiver 101 and processed by the signal processor 105 therein (operation S27).

As described above, the controller 115 may control the signal processor 105 to resume playing the stored primary image content or control the UI generator to generate the UI of the list illustrating the stored primary image content if the playing of the related image content is finished.

Thus, a user may select and view the previously-broadcasted related image content of the currently-viewed primary image content through simple key manipulations. As the image processing apparatus 100 requests the related image content, a user does not need to search the related image content one at a time.

Additionally, if the related image content of the displayed primary image content is selected, the currently-displayed primary image content is additionally stored. Thus, a user may consecutively view the primary image content after viewing the related image content.

As described above, the exemplary embodiment of the present invention provides an image processing apparatus which may be easily manipulated to select and view related image content of currently-viewed primary image content, and a control method thereof.

Additionally, the exemplary embodiment of the present invention provides an image processing apparatus and a control method thereof which automatically requests, receives and displays related image content selected by a user, and improves user's convenience as a user does not need to search the related image content one at a time.

Further, the exemplary embodiment of the present invention provides an image processing apparatus which additionally stores a currently-displayed primary image content if related image content of the displayed primary image content are selected so that a user may consecutively view the primary image content after viewing the related image content, and a control method thereof.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
   a receiver;
   a communicator;
   an input receiver; and
   a processor configured to:
      receive data corresponding to a broadcast content corresponding to a selected channel which is selected by a user through the receiver,
      control the display to display the broadcast content on the selected channel,
      based on a first command being received through the input receiver while the broadcast content is displayed on the display,
      transmit a request for data corresponding to a related content of the displayed broadcast content according to information related to the displayed broadcast content to an external source through the communicator,
      control the display to display a list of the related content corresponding to the data received from the external source through the communicator together with the displayed broadcast content without searching the related content of the displayed broadcast content by the user, and
      based on a second command being received through the input receiver for selecting one included in the list of the related content, receive data corresponding to the selected content included in the list through the communicator, and control the display to display the selected content received through the communicator instead of the broadcast content received through the receiver.

2. The display apparatus of claim 1, wherein the receiver includes a tuner configured to receive a radio frequency (RF) broadcast signal in real-time.

3. The display apparatus of claim 1, wherein the information related to the displayed broadcast content includes at least one of a title, a content, and a genre of the displayed broadcast content.

4. The display apparatus of claim 1, wherein the list of the related content is displayed together with the broadcast content output via the selected channel which is selected by the user.

5. The display apparatus of claim 4, wherein the list of the related content is overlaid on the broadcast content being displayed.

6. The display apparatus of claim 4, wherein the list of the related content is overlaid on a portion of the display while maintaining a screen size at which the broadcast content is displayed.

7. The display apparatus of claim 1, wherein the information related to the displayed broadcast content corresponds to information included in the data corresponding to the broadcast content received through the receiver.

8. The display apparatus of claim 7, wherein the processor is further configured to:
    identify the information included in the data corresponding to the broadcast content received through the receiver, and
    receive data corresponding to the list of the related content based on the identified information from the external source through the communicator according to the received first command.

9. The display apparatus of claim 1, wherein the selected content is displayed on a screen after the displaying of the broadcast content received through the receiver is stopped.

10. The display apparatus of claim 1, wherein the related content is included in the list based on a relevance with the broadcast content instead of a user selection.

11. The display apparatus of claim 1, wherein the displayed list includes information corresponding to at least one of a previous episode or a subsequent episode of the broadcast content.

12. A method of controlling a display apparatus, the method comprising:
    receiving data corresponding to a broadcast content corresponding to a selected channel which is selected by a user through a receiver;
    displaying the broadcast content on the selected channel;
    based on a first command being received through an input receiver while the broadcast content is displayed on the display,
        transmitting a request for data corresponding to a related content of the displayed broadcast content according to information related to the displayed broadcast content to an external source through a communicator;
        displaying a list of the related content corresponding to the data received from the external source through the communicator together with the displayed broadcast content without searching the related content of the displayed broadcast content by the user; and
    based on a second command for selecting one included in the list of the related content being received through the input receiver, receiving data corresponding to the selected content included in the list through the communicator, and displaying the selected content received through the communicator instead of the broadcast content received through the receiver.

13. The method of claim 12, wherein the receiver includes a tuner configured to receive a radio frequency (RF) broadcast signal in real-time.

14. The method of claim 12, wherein the list of the related content is displayed together with the broadcast content output via the selected channel which is selected by the user.

15. The method of claim 14, wherein the list of the related content is overlaid on the broadcast content being displayed.

16. The method of claim 14, wherein the list of the related content is overlaid on a portion of the display while maintaining a screen size at which the broadcast content is displayed.

17. The method of claim 12, wherein the information related to the displayed broadcast content includes at least one of a title, a content, and a genre of the displayed broadcast content.

18. The method of claim 12, wherein the information related to the displayed broadcast content corresponds to information included in the data corresponding to the broadcast content received through the receiver.

19. The method of claim 18, further comprising:
    identifying the information included in the data corresponding to the broadcast content received through the receiver; and
    receiving data corresponding to the list of the related content based on the identified information from the external source through the communicator according to the received first command.

20. The method of claim 12, wherein the selected content is displayed on a screen after the displaying of the broadcast content received through the receiver is stopped.

21. The method of claim 12, wherein the related content is included in the list based on a relevance with the broadcast content instead of a user selection.

22. The method of claim 12, wherein the displayed list includes information corresponding to at least one of a previous episode or a subsequent episode of the broadcast content.

* * * * *